Patented Dec. 29, 1936

2,065,879

UNITED STATES PATENT OFFICE 2,065,879

DERIVATIVES OF AMINO-QUINOLINES AND METHOD OF MAKING SAME

Lorenz Ach and Christian von Hofe, Mannheim-Waldhof, Germany, assignors to C. F. Boehringer & Soehne G. m. b. H., Mannheim-Waldhof, Germany No Drawing. Application January 11, 1933, Serial No. 651,230. In Germany January 16, 1932

6 Claims. (Cl. 260—38)

Our invention refers to new chemical products being derivatives of 8-aminoquinoline and of the substitution products thereof, and the method of producing same.

We have found that on acting with nitrous acid on 8-aminoquinolines substituted in 6-position by an alkoxy group, new compounds are formed which are not identical with the diazo compounds which one might expect to obtain in this reaction. The new compounds crystallize readily from the acid solution and have been found to be stable colourless or only slightly coloured and to possess a high decomposition temperature. It is characteristic of these compounds, that they decompose within a well defined temperature interval.

We have found by analysis that the new compounds have the formula $C_9H_6N_3OR$, wherein R is an alkoxy group in 6-position, and are isomers of the diazonium hydroxides of 8-aminoquinolines substituted in 6-position by an alkoxy group substituted in 6-position and it may be assumed that the acetylatable products may be azimides of dihydro-2-hydroxy quinolines having the general formula

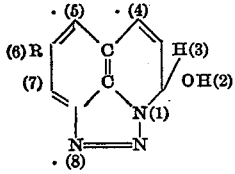

We obtained the new products by acting with nitrous acid in the manner known from diazotization on 8-aminoquinolines substituted in 6-position by an alkoxy group, preferably avoiding the presence of a greater excess of acid, and separating out the reaction products without allowing them to undergo further reactions. According to the manner in which the nucleus of the 8-aminoquinoline is substituted, the reaction proceeds more quickly or slowly.

The completion of the reaction and separation of the reaction products may be furthered and accelerated, if desired, by the addition of inert neutralizing agents, such as sodium sulfate, calcium carbonate or the like.

The new compounds are adapted for use as such and as intermediate products in the production of remedies. In practicing our invention, we may for instance proceed as follows:—

Example 1

9.14 grams 6-methoxy-8-aminoquinoline hydrochloride are heated with 200 ccms. water and the solution allowed to cool down again. 80 ccms. normal hydrochloric acid and 200 grams ice are added and after the temperature has dropped down to 0° C., a solution of 2.9 grams sodium nitrite in 20 ccms. water is added in one portion. When this solution is agitated, it soon assumes as a rule a slightly reddish tint. It is allowed to stand on ice for two hours, whereafter the new compound starts precipitating. After the solution has been allowed to stand overnight at room temperature the crystallization has come to an end and the product is now washed with water and thereafter with some alcohol. The yield is 7.4 grams=91.1% of the calculated yield. The crystal powder which shows a slightly reddish tint, is re-crystallized from the 150-fold quantity of alcohol in the presence of carbon and now forms long colourless fibriform needles melting under decomposition at 201° C. and having the constitution $C_{10}H_9O_2N_3$. By acting thereon with acetic anhydride one obtains the product $C_{12}H_{11}O_3N_3$, as shown by analysis as follows:

C_____ 58.3% (calculated 58.77)
H_____ 4.9% (calculated 4.49)
N_____ 17.6% (calculated 17.14)

Example 2

6.96 grams 6-methoxy-8-aminoquinoline are dissolved in 120 ccms. hot normal hydrochloric acid (=3 mols) and the solution is allowed to cool down under agitation, whereupon the methoxy-aminoquinoline hydrochloride separates out in the form of fine crystals. After cooling down to 0° C. the mixture thus obtained is diazotized with a solution of 2.88 grams sodium nitrite in 20 ccms. water, ice being added to the mixture. One now adds 12.8 grams crystallized sodium sulfate which is quickly dissolved and allows the solution to stand at ordinary temperature. Already after ½ hour the new compound starts separating out and after a further 2 hours the separation is completed. The product is washed with water and thereafter with some alcohol. One thus obtains 7.44 grams=91.6% of the calculated yield.

Partial neutralization of the acid may also be effected by suitable means other than sodium sulfate. If for instance to the diazo solution described in this example 2 grams marble are added in small pieces, corresponding to 1 mol. hydrochloric acid, they gradually dissolve and from the now less acid solution the new compound separates out after ½ hour, the separation being completed after a further 2 hours and the yield being 7.36 grams=90.6% of the calculated yield.

*Example 3*

9 grams 6-ethoxy-8-aminoquinoline hydrochloride are dissolved in 40 ccms. warm normal hydrochloric acid and the solution is allowed to cool down under agitation in order to obtain as fine grained crystals as possible. 100 grams ice are now added and the mixture cooled down to about 0° C. is diazotized under vigorous stirring with a solution of 2.9 grams sodium nitrite in 20 ccms. water. A slightly brownish coloured solution is formed, which is withdrawn from the cooling liquor after one hour and allowed to stand at room temperature. After the lapse of 3 hours the new product begins separating out and on standing overnight all of the new product has settled down. The mass is now filtered by suction and washed first with water and thereafter with a little alcohol. One thus obtains 3.6 grams corresponding to 82.9% of the calculated yield. By recrystallization from about 140 parts alcohol, to which has been added some carbon, one obtains fine glossy, almost colourless small needles, which are decomposed when heated to 182° C. By analysis the constitution of the product is found to be $C_{11}H_{11}O_2N_3$.

Various changes may be made in the details disclosed in the foregoing specification without departing from the invention or sacrificing the advantages thereof.

We claim:—

1. The method of producing an isomer of the diazonium hydroxide of 6-methoxy-8-aminoquinoline comprising acting on this latter product in the presence of hydrochloric acid at low temperature with a solution of sodium nitrite and isolating the crystalline product.

2. The method of producing an isomer of the diazonium hydroxide of 6-ethoxy-8-aminoquinoline comprising acting on this latter product in the presence of hydrochloric acid at low temperature with a solution of sodium nitrite and isolating the crystalline product.

3. An azimide of dihydro-2-hydroxy-6-methoxyquinoline being the isomer of the diazonium hydroxide of 6-methoxy-8-aminoquinoline, the compound being a colorless product forming long fibriform needles melting under decomposition at 201° C.

4. An azimide of dihydro-2-hydroxy-6-ethoxyquinoline being the isomer of the diazonium hydroxide of 6-ethoxy-8-aminoquinoline, having the form of glossy, almost colorless small needles decomposed at 182° C.

5. The method of producing isomers of diazonium hydroxides of an 8-aminoquinoline substituted in 6-position by an alkoxy group, comprising acting on such substituted 8-aminoquinoline with hydrochloric acid and sodium nitrite and isolating the solid reaction product.

6. The azimides of dihydro-2-hydroxy-6-alkoxy-quinoline, being the isomers of the diazonium hydroxides of 6-alkoxy-8-aminoquinolines, the compounds being substantially colorless needles decomposed at temperatures near 200° C.

LORENZ ACH.
CHRISTIAN von HOFE.